US005660687A

United States Patent [19]

Allen et al.

[11] Patent Number: 5,660,687

[45] Date of Patent: Aug. 26, 1997

[54] CREPING RELEASE AGENTS

[75] Inventors: Anthony John Allen, Wilmington; George Lock, Newark, both of Del.

[73] Assignee: Hercules Incorporated, Wilmington, Del.

[21] Appl. No.: 643,645

[22] Filed: May 6, 1996

Related U.S. Application Data

[62] Division of Ser. No. 428,287, Apr. 25, 1995, abandoned.

[51] Int. Cl.$^{6}$ .............................. B31F 1/12; D21H 17/56; B32B 29/06

[52] U.S. Cl. ........................... 162/111; 162/112; 428/153; 156/183

[58] Field of Search .................................... 162/111, 112; 524/377; 428/153

[56] References Cited

U.S. PATENT DOCUMENTS

| | | | |
|---|---|---|---|
| 2,595,935 | 5/1952 | Daniel | 92/3 |
| 3,248,353 | 4/1966 | Coscia | 260/29.2 |
| 3,556,932 | 1/1971 | Coscia et al. | 162/166 |
| 3,655,506 | 4/1972 | Baggett | 162/164 |
| 5,187,219 | 2/1993 | Furman, Jr. | 524/377 |
| 5,223,096 | 6/1993 | Phan et al. | 162/111 |
| 5,246,544 | 9/1993 | Hollenberg et al. | 162/111 |
| 5,324,561 | 6/1994 | Rezai et al. | 428/72 |
| 5,326,434 | 7/1994 | Carevic et al. | 162/111 |
| 5,338,807 | 8/1994 | Espy et al. | 525/430 |
| 5,367,005 | 11/1994 | Nachfolger | 523/403 |
| 5,397,435 | 3/1995 | Ostendorf et al. | 162/112 |

FOREIGN PATENT DOCUMENTS

| | | |
|---|---|---|
| 979579 | 12/1975 | Canada . |
| 93/09287 | 5/1993 | WIPO . |

OTHER PUBLICATIONS

Espy "An Introduction to Creping and Release Agents on the Yankee Dryer".

*Primary Examiner*—Tae Yoon
*Attorney, Agent, or Firm*—Martin F. Sloan; Mark D. Kuller; Joanne W. Patterson

[57] ABSTRACT

A composition for creping fibrous webs comprises (1) a polyamine/epihalohydrin resin creping adhesive, and (2) a creping release agent that is a plasticizer for the polyamine/epihalohydrin resin and has a swelling ratio of at least 0.10 and a solubility parameter >20 MPa$^{1/2}$. Also disclosed is a process for creping fibrous webs in which the creping adhesive and the release agent can be applied together or separately to a drying surface for the fibrous web.

23 Claims, No Drawings

CREPING RELEASE AGENTS

This application is a division of application Ser. No. 08/428,287, filed Apr. 25, 1995 abandoned.

This invention relates to the creping of wet-laid paper products.

BACKGROUND OF THE INVENTION

In the manufacture of certain wet-laid paper products such as facial tissue, bathroom tissue, or paper towels, the paper web is conventionally subjected to a creping process in order to give it desirable textural characteristics, such as softness and bulk. The creping process typically involves adhering the web to a rotating creping cylinder, such as the apparatus known as a Yankee dryer, and then dislodging the adhered web with a doctor blade. The impact of the web against the doctor blade ruptures some of the fiber-to-fiber bonds within the web and causes the web to wrinkle or pucker.

The severity of this creping action is dependent upon a number of factors, including the degree of adhesion between the web and the surface of the creping cylinder. Greater adhesion causes increased softness, although generally with some loss of strength. In order to increase adhesion, an adhesive creping aid is used to enhance any naturally occurring adhesion that the web may have due to its water content, which will vary widely depending on the extent to which the web has been previously dried. Creping aids should also prevent wear of the dryer surface and provide lubrication between the doctor blade and the dryer surface and reduce chemical corrosion, as well as controlling the extent of creping. A coating that adheres the sheet just tightly enough to the drum will give a good crepe, imparting absorbance and softness with the least possible loss of paper strength. If adhesion to the dryer drum is too strong, the sheet may pick or even "plug", i.e., underride the doctor blade, and wrap around the dryer drum. If there is not enough adhesion, the sheet will lift off too easily and undergo too little creping.

The creping adhesive, as an aqueous solution or dispersion, is usually sprayed onto the surface of the creping cylinder, e.g., a Yankee dryer. This improves heat transfer, allowing more efficient drying of the sheet. If the pulp furnish sticks too strongly to the creping cylinder, release agents can be sprayed on the cylinder. The release agents are typically hydrocarbon oils. These agents aid in the uniform release of the tissue web at the creping blade, and also lubricate and protect the blade from excessive wear.

A creping adhesive composition is disclosed in U.S. Pat. No. 5,187,219. The composition comprises a water-soluble glyoxylated acrylamide/diallyldimethylammonium chloride polymer and a water-soluble polyol having a molecular weight below 3000 as a plasticizer for the polymer. U.S. Pat. No. 5,246,544 discloses a reversibly crosslinked creping adhesive which contains a nonself-crosslinkable material that is a polymer or oligomer having functional groups that can be crosslinked by ionic crosslinking and at least one metal, cationic crosslinking agent having a valence of four or more. The adhesive can also contain additives to modify the mechanical properties of the crosslinked polymers, e.g., glycols, polyethylene glycols, and other polyols such as simple sugars and oligosaccharides. Polyamidoamine/epichlorohydrin creping adhesives, such as those disclosed in U.S. Pat. No. 5,338,807 and Canadian Patent 979,579, are currently used in conjunction with hydrocarbon oils. These oils are not compatible with the creping adhesive and do not form uniform coatings on the drying cylinder.

Since the hydrocarbon oils currently in use as creping release aids are not compatible with the creping adhesive, there is a need for improved creping compositions, particularly for use with polyamidoamine/epichlorohydrin creping adhesives.

SUMMARY OF THE INVENTION

The composition of this invention for creping fibrous webs comprises (a) a polyamine/epihalohydrin resin creping adhesive, and (b) a creping release agent that is a plasticizer for the polyamine/epihalohydrin resin and has a swelling ratio of at least 0.10 and a solubility parameter greater than 20 $MPa^{1/2}$. These release agents are compatible with and soluble in the creping adhesive.

Also disclosed is a process for creping fibrous webs in which the creping adhesive and the release agent described above are applied either together or separately to a drying surface for the fibrous web.

Use of the combination of the creping adhesives and the release agents described above results in better control of the creping process, i.e., more flexibility in controlling the adhesion of the paper to the drying surface and release of the paper at the creping blade.

DETAILED DESCRIPTION OF THE INVENTION

Any polyamine/epihalohydrin resin can be used as the creping adhesive in the composition of this invention. The creping adhesives are the reaction product of an epihalohydrin and a polyamine resin, including, for example, polyalkylene polyamine resins and the specific class of polyamine resins known as polyamidoamine (PAA) resins. The polyalkylene polyamines include, for example, diethylenetriamine and dihexamethylenetriamine. Preparation of polyalkylene polyamine/epihalohydrin resins is described, for example, in U.S. Pat. Nos. 2,595,935; 3,248,353 and 3,655,506, the disclosures of which are incorporated by reference in their entirety. The PAA resins are made from a polyalkylene polyamine having at least one secondary amine group and a saturated aliphatic dicarboxylic acid or dicarboxylic acid derivative. Preparation of polyamidoamine/epihalohydrin resins is described, for example, in U.S. Pat. No. 5,338,807 and Canada 979,579, the disclosures of which are incorporated by reference in their entirety. These polyamine/epihalohydrin resins are typically water-soluble and crosslinkable. Suitable resins include KYMENE® 557H wet strength resin and Crepetrol® 73, 80E, and 190 cationic polymers, available from Hercules Incorporated, Wilmington, Del., U.S.A. Polyamidoamine/epihalohydrin resins are preferred, particularly resins that are the reaction product of epichlorohydrin and a polyamidoamine made from adipic acid and methylbis(aminopropylamine), with a mole ratio of epichlorohydrin to amine groups in the polyamide of 0.25.

The release agents used in the composition of this invention have a swelling ratio of at least 0.10 and a solubility parameter of >20 $MPa^{1/2}$ in the particular polyamine/epihalohydrin creping adhesive that is selected. Depending on the particular combination of creping adhesive and release agent that is selected, the swelling ratio can be as high as 18 or more and the solubility parameter can be as high as 30 or more. The swelling ratio and solubility parameter are determined by the methods described below. Suitable release agents include, for example, aliphatic polyols or oligomers thereof having a number average molecular weight of less than 600, polyalkanolamines, aromatic sulfonamides, pyrrolidone, and mixtures thereof. Specific examples of release agents include, for example, ethylene glycol; propylene glycol; diethylene glycol; glycerol; pyrrolidone; triethanolamine; diethanolamine; polyethylene glycol; dipropylene glycol; Uniplex 108, an aromatic sulfonamide available from Unitex Chemical Corporation, Greenville, N.C., U.S.A., and mixtures thereof. Ethylene glycol, propylene glycol, diethylene glycol, and glycerol are preferred. Ethylene glycol is most preferred. These compounds are compatible with and soluble in the polyamine/epihalohydrin creping adhesive and act as a plasticizer for the adhesive.

The relative amounts of the creping adhesive and the release agent used in the practice of this invention depend upon a wide variety of factors such as, for example, the type of polyamine/epihalohydrin resin used, the type of paper being made, the machine conditions used for papermaking, the balance between the paper properties desired and the operating conditions, e.g., light vs heavy crepe, running the paper machine fast or slow, and how effective the release agent is as a plasticizer. These factors will also influence the choice of the preferred combination of creping adhesive and release agent that is selected for a particular papermaking system. Generally the amount of release agent used falls within the range of 0.01–90% by weight, based on the total weight of the composition.

Fibrous webs are creped using the composition of this invention by (1) applying the composition described above to a drying surface for the fibrous web, (2) pressing the fibrous web against the drying surface to effect adhesion of the web to the drying surface, and (3) dislodging the web from the drying surface with a creping device such as a doctor blade to crepe the fibrous web.

Alternatively, the polyamine/epihalohydrin resin creping adhesive can be applied first, and then the release agent. As matter of convenience, the composition or the two separate components are typically applied as an aqueous solution.

EXAMPLES

In order to quantify the compatibility of candidate plasticizers with the creping adhesive, the swelling of creping adhesive samples in a number of plasticizers and solvents was measured. Cast polymer films were prepared by placing aqueous solutions of creping adhesives, with or without added plasticizer, in aluminum pans that were thoroughly sprayed with mold release. The pans were heated in a forced air oven according to the following regime:

4 hours at 35° C.
4 hours at 40° C.
Overnight at 45° C.
Next day,
4 hours at 50° C.
4 hours at 60° C.
Overnight at 80° C.

The Shore A hardness was measured by ASTM method D2240-86 before removing the samples from the pans. A PTC Instruments Model 306L Type A Durometer was used for the measurements. The scale runs from zero hardness for a liquid to 100 for a hard surface such as glass. After removal from the pans, the samples were stored in a desiccator to prevent moisture pickup.

A sample of each film weighing between 0.4 and 0.6 g was weighed to 0.0001 g and was placed in an excess (30 ml) of a candidate plasticizer. These experiments were performed using three samples of each creping adhesive/plasticizer combination. With the sole exception of water, the samples were weighed daily over a one week period. Swelling in water was measured at 24 hours. Samples were handled with tweezers and were patted dry with tissue to remove excess plasticizer on the surface before weighing. The swelling ratio [Q(t)] was calculated as the mass of plasticizer imbibed by the sample to the original sample weight.

$$Q(t)=[M(t)-M(0)]/M(0)$$

where M(0) is the original sample weight and M(t) is the swollen sample weight at time t.

In some cases, such as water and ethylene glycol, the swollen samples broke apart into many small pieces. When this occurred, the swollen sample was collected in a tared steel mesh funnel (~50 mm diameter×50 mm high, 100 mesh monel steel). The excess plasticizer was removed by patting the underside of the funnel with tissue. The swollen sample was then weighed.

Glass transition temperature ($T_g$) was determined by differential scanning calorimetry (DSC) using a DuPont 910 robotic DSC with a model 2100 controller-analyzer over the range of −100° C. to 120° C. The determinations were performed in an open pan with nitrogen purging at a scan rate of 20° C./minute. The reported $T_g$ values are the onset temperatures from the second heating cycle.

The results of these tests are shown in Tables 1–6. In the tables EG=ethylene glycol; PG=propylene glycol; DEG=diethylene glycol; GLY=glycerol; PEG-200=polyethylene glycol, number average molecular weight 200; PEG-300=polyethylene glycol, number weight molecular weight 300, K-557H=Kymene® 557H wet strength resin, and U-108=Uniplex 108, an aromatic sulfonamide available from Unitex Chemical Corporation, Greenville, N.C., U.S.A. Creping adhesive A was a polyamidoamine/epichlorohydrin resin sold by Hercules Incorporated, Wilmington, Del. under the name Crepetrol® 190. Creping adhesive B was a polyamidoamine/epichlorohydrin resin sold by Hercules Incorporated under the name Crepetrol® 80E. In Tables 3–6, the % plasticizer added and the final plasticizer concentration are by weight, based on the weight of the creping adhesive. Water and some plasticizer are lost during heating of the samples.

TABLE 1

Solvent Swelling of Creping Adhesives

| Solvent | Solubility Parameter ($MPa^{1/2}$) | Swelling Ratio: Q(150)[1] K-557H | A | B |
|---|---|---|---|---|
| Water[2] | 47.9 | 5.92 | 13.9 | 23.1 |
| Glycerol | 33.8 | 0.502 | 1.94 | 0.538 |
| Pyrrolidone | 30.1 | 0.206 | 14.9 | 0.247 |
| Ethylene glycol | 29.9 | 6.10 | 15.5 | 12.9 |
| Tetramethylene sulfone[3] | 27.4 | 0.00163 | 0.0732 | −0.0257 |
| Triethanolamine | 26.9 | 0.0399 | 0.672 | 0.379 |
| Propylene glycol | 25.8 | 0.306 | 14.0 | 1.36 |
| Diethanolamine | 25.6 | 0.0950 | 0.432 | 0.161 |
| N,N-Dimethylformamide | 24.8 | 0.590 | 0.333 | 0.0193 |
| Diethylene glycol | 24.8 | 1.62 | 17.5 | 1.55 |
| 1,4-Butanediol | 24.8 | 0.329 | 9.86 | 0.729 |
| U-108 | 24.3 | −0.0318 | 2.38 | 0.457 |
| Isopropanol | 23.5 | 0.0171 | 0.806 | 0.0266 |
| Morpholine | 22.1 | 1.05 | 0.435 | 0.159 |
| Triethylene glycol | 21.9 | 0.356 | 10.1 | 0.650 |
| Dipropylene glycol | 20.5 | 0.0060 | 1.88 | 0.0762 |

TABLE 1-continued

Solvent Swelling of Creping Adhesives

| Solvent | Solubility Parameter ($MPa^{1/2}$) | Swelling Ratio: Q(150)[1] K-557H | A | B |
|---|---|---|---|---|
| Polyethylene glycol; 200 MW | | 0.0761 | 3.25 | 0.238 |
| Polyethylene glycol; 300 MW | | 0.0215 | 0.768 | 0.0547 |

[1]Q(150) = Swelling ratio at 150 hours.
[2]Swelling in water was determined at 24 hours.
[3]This solvent has a medium hydrogen bonding rating; all others are good hydrogen bonders.

TABLE 2

Creping Adhesive Combinations with EG & PG

| Polymer | Plasticizer Added | Final Plasticizer Concentration | Shore A Hardness | Tg (°C.) |
|---|---|---|---|---|
| K-557H | None | | 94 | 20.0 |
| K-557H | 5% EG | 1.49% | 88 | −3.0 |
| K-557H | 10% EG | 4.48% | 84 | −12.3 |
| K-557H | 5% PG | 6.72% | 84 | −9.2 |
| K-557H | 10% PG | 7.46% | 84 | −12.1 |
| A | None | | 65 | −0.2 |
| A | 5% EG | 2.27% | 73 | −3.8 |
| A | 10% EG | 5.30% | 53 | −27.3 |
| A | 5% PG | 2.27% | 64 | −0.7 |
| A | 10% PG | 5.30% | 53 | −14.7 |
| B | None | | 84 | −19.2 |
| B | 5% EG | 2.89% | | −18.4 |
| B | 10% EG | 6.14% | | −31.8 |
| B | 5% PG | 3.97% | | −25.4 |
| B | 10% PG | 7.22% | | −29.4 |

TABLE 3

Creping Adhesive Combinations with DEG & GLY

| Polymer | Plasticizer Added | Final Plasticizer Concentration | Shore A Hardness | Tg (°C.) |
|---|---|---|---|---|
| K-557H | None | | 92 | 21.5 |
| K-557H | 5% DEG | 3.76% | 86 | 13.3 |
| K-557H | 10% DEG | 8.27% | 82 | 10.4 |
| K-557H | 5% GLY | 3.76% | 84 | −4.0 |
| K-557H | 10% GLY | 8.27% | 83 | −1.4 |
| A | None | | 65 | −0.2 |
| A | 5% DEG | 3.79% | 66 | −6.5 |
| A | 10% DEG | 6.81% | 53 | −19.1 |
| A | 5% GLY | 4.55% | 63 | −15.9 |
| A | 10% GLY | 9.09% | 54 | −27.5 |
| B | None | | 87 | −2.3 |
| B | 5% DEG | 3.60% | 75 | −16.1 |
| B | 10% DEG | 7.55% | 75 | −19.5 |
| B | 5% GLY | 3.60% | 80 | −12.1 |
| B | 10% GLY | 8.63% | 64 | −21.6 |

TABLE 4

Creping Adhesive Combinations with EG & PG

| Polymer | Plasticizer Added | Final Plasticizer Concentration | Shore A Hardness | Tg (°C.) |
|---|---|---|---|---|
| K-557H | None | | 86 | 17.8 |
| K-557H | 15% EG | 8.27% | 67 | 0.6 |
| K-557H | 20% EG | 10.5% | 72 | −7.4 |
| K-557H | 15% PG | 9.02% | 72 | −0.1 |
| K-557H | 20% PG | 11.3% | 64 | −5.2 |
| A | None | | 77 | −4.7 |
| A | 15% EG | 6.77% | 44 | −24.4 |
| A | 20% EG | 6.77% | 58 | −30.8 |
| A | 15% PG | 6.02% | | −23.0 |
| A | 20% PG | 10.5% | 37 | −28.0 |
| B | None | | 82 | 8.7 |
| B | 15% EG | 7.91% | 50 | −11.5 |
| B | 20% EG | 10.4% | 45 | −21.0 |
| B | 15% PG | 8.99% | 56 | −8.9 |
| B | 20% PG | 11.9% | 54 | −15.9 |

TABLE 5

Creping Adhesive Combinations with DEG & GLY

| Polymer | Plasticizer Added | Final Plasticizer Concentration | Shore A Hardness | Tg (°C.) |
|---|---|---|---|---|
| K-557H | None | | 91 | 14.3 |
| K-557H | 15% DEG | 11.2% | 81 | −6.9 |
| K-557H | 20% DEG | 14.2% | 77 | −16.4 |
| K-557H | 15% GLY | 11.9% | 82 | −3.7 |
| K-557H | 20% GLY | 16.4% | 75 | −14.8 |
| A | None | | 88 | −18.8 |
| A | 15% DEG | 10.6% | 63 | −43.4 |
| A | 20% DEG | 12.9% | 46 | −45.8 |
| A | 15% GLY | 12.1% | 64 | −40.3 |
| A | 20% GLY | 16.7% | 64 | −55.0 |
| B | None | | 90 | 7.5 |
| B | 15% DEG | 10.8% | 66 | −6.6 |
| B | 20% DEG | 14.4% | 63 | −11.9 |
| B | 15% GLY | 12.6% | 65 | −29.0 |
| B | 20% GLY | 16.2% | 55 | −37.0 |

TABLE 6

Creping Adhesive Combinations with PEG-200 & PEG-300

| Polymer | Plasticizer Added | Final Plasticizer Concentration | Shore A Hardness | Tg (°C.) |
|---|---|---|---|---|
| K-557H | None | | 74 | −4.5 |
| K-557H | 5% PEG-200 | 5.1% | 68 | −11.7 |
| K-557H | 10% PEG-200 | 9.5% | 62 | −16.0 |
| K-557H | 5% PEG-300 | 4.4% | 69 | −9.8 |
| K-557H | 10% PEG-300 | 10.2% | 62 | −14.5 |
| A | None | | 54 | −11.5 |
| A | 5% PEG-200 | 3.7% | 45 | −18.4 |
| A | 10% PEG 200 | 6.6% | 35 | −22.3 |
| A | 5% PEG-300 | 3.7% | 37 | −15.0 |
| A | 10% PEG-300 | 7.4% | 38 | −19.8 |
| B | None | | 57 | −6.8 |
| B | 5% PEG-200 | 4.2% | 58 | −11.3 |
| B | 10% PEG-200 | 7.7% | 48 | −14.8 |
| B | 5% PEG-300 | 4.5% | 59 | −10.0 |
| B | 10% PEG-300 | 7.3% | 63 | −15.3 |

The addition of these plasticizers to the creping adhesives resulted in a significant drop in the glass transition temperature ($T_g$), which was proportional to the amount of plasticizer added. The hardness of these materials also decreased with increasing levels of added plasticizer. These data demonstrate the effectiveness of the compounds tested as plasticizers for the creping adhesives. Plasticizers are known to lower the $T_g$ and decrease the hardness of the materials to which the are added.

It is not intended that the examples given here should be construed to limit the invention, but rather they are submitted to illustrate some of the specific embodiments of the invention. Various modifications and variations of the present invention can be made without departing from the scope of the appended claims.

We claim:

1. A method for creping fibrous webs comprising (1) providing a fibrous web, (2) applying to a drying surface for the fibrous web at least one polyamine/epihalohydrin resin creping adhesive, and at least one creping release agent that is a plasticizer for the polyamine/epihalohydrin resin selected from the group consisting of ethylene glycol, propylene glycol, diethylene glycol, glycerol, triethylene glycol, dipropylene glycol, polyalkanolamines, aromatic sulfonamides, pyrrolidone and mixtures thereof, (3) pressing the fibrous web against the drying surface to adhere the web to the drying surface, and (4) dislodging the web from the drying surface with a creping device to crepe the fibrous web.

2. The method of claim 1, wherein the release agent is selected from the group consisting of ethylene glycol, propylene glycol, diethylene glycol, glycerol, pyrrolidone, triethanolamine, diethanolamine, triethylene glycol, dipropylene glycol, aromatic sulfonamides, and mixtures thereof.

3. The method of claim 1, wherein the release agent is selected from the group consisting of ethylene glycol, propylene glycol, diethylene glycol, triethylene glycol, dipropylene glycol and glycerol.

4. The method of claim 3, wherein the release agent is ethylene glycol.

5. The method of claim 1, wherein the creping adhesive is a polyalkylene polyamine/epihalohydrin resin.

6. The method of claim 5, wherein the epihalohydrin is epichlorohydrin.

7. The method of claim 1, wherein the creping adhesive is a polyamidoamine/epihalohydrin resin.

8. The method of claim 7, wherein the polyamidoamine is the reaction product of a polyalkylene polyamine and a saturated aliphatic dicarboxylic acid or ester of said acid.

9. The method of claim 8, wherein the polyamidoamine is the reaction product of adipic acid or an ester thereof and methylbis(aminopropylamine), and the creping adhesive contains 0.25 moles of epichlorohydrin per mole of amine groups in the polyamidoamine.

10. The method of claim 7, wherein the epihalohydrin is epichlorohydrin.

11. The method of claim 8, wherein the polyamidoamine is the reaction product of adipic acid or an ester thereof and diethylenetriamine.

12. The method of claim 1, wherein the fibrous web is a cellulosic web.

13. The method of claim 1, wherein the creping release agent is used at a level of from about 0.01 to about 90% by weight based on the total weight of creping release agent and creping adhesive.

14. The method of claim 12, wherein the epihalohydrin is epichlorohydrin, the polyamine is a polyamidoamine reaction product of adipic acid or an ester thereof and a polyalkylene polyamine, and the creping release agent, selected from the group consisting of ethylene glycol, propylene glycol, diethylene glycol, triethylene glycol, dipropylene glycol and glycerol, is used at a level of from about 0.01 to about 90% by weight based on the total weight of creping release agent and creping adhesive.

15. The method of claim 14, wherein the creping release agent is used at a level of from about 5 to about 20% by weight based on the total weight of creping release agent and creping adhesive.

16. The method of claim 1, wherein the creping adhesive and the creping release agent are applied as aqueous solutions.

17. The method of claim 14, wherein the creping adhesive and the creping release agent are applied as aqueous solutions.

18. The method of claim 1, wherein the creping adhesive and the creping release agent are applied together.

19. The method of claim 1, wherein the creping adhesive and the creping release agent are applied separately.

20. The method of claim 19, wherein the creping adhesive is applied before the creping release agent.

21. The method of claim 12, wherein the drying surface is the cylinder of a Yankee dryer.

22. Creped paper prepared by the method of claim 12.

23. Creped paper prepared by the method of claim 14.

* * * * *